US008916505B2

(12) United States Patent
Skala

(10) Patent No.: US 8,916,505 B2

(45) Date of Patent: Dec. 23, 2014

(54) CORDIERITE HAVING AN INCREASED ALPHA-CORDIERITE PHASE AND A PROPPANT CONTAINING THE SAME

(75) Inventor: Robert D. Skala, Katy, TX (US)

(73) Assignee: Oxane Materials, Inc., Houston, TX (US)

( * ) Notice: Subject to any disclaimer, the term of this patent is extended or adjusted under 35 U.S.C. 154(b) by 301 days.

(21) Appl. No.: 12/951,347

(22) Filed: Nov. 22, 2010

(65) Prior Publication Data

US 2011/0143969 A1 Jun. 16, 2011

Related U.S. Application Data

(60) Provisional application No. 61/286,833, filed on Dec. 16, 2009.

(51) Int. Cl.

| | |
|---|---|
| ***C04B 35/195*** | (2006.01) |
| ***C04B 35/626*** | (2006.01) |
| ***C09K 8/80*** | (2006.01) |
| ***C04B 38/00*** | (2006.01) |
| *C04B 111/00* | (2006.01) |

(52) U.S. Cl.

CPC ............... *C09K 8/80* (2013.01); *C04B 2235/96* (2013.01); *C04B 2111/00612* (2013.01); *C04B 35/62675* (2013.01); *C04B 2235/80* (2013.01); *C04B 2235/3481* (2013.01); *C04B 2235/77* (2013.01); *C04B 38/0074* (2013.01); *C04B 35/195* (2013.01)

USPC .......................................... 507/140; 501/153

(58) Field of Classification Search

CPC ....... C04B 35/195; C04B 35/626; C09K 8/80

See application file for complete search history.

(56) References Cited

U.S. PATENT DOCUMENTS

| | | | | |
|---|---|---|---|---|
| 4,547,468 | A * | 10/1985 | Jones et al. | 501/33 |
| 5,030,592 | A | 7/1991 | Komarneni et al. | |
| 5,607,885 | A * | 3/1997 | Ichii et al. | 501/9 |
| 6,616,873 | B1 | 9/2003 | Duraiswami et al. | |
| 7,067,187 | B2 | 6/2006 | Kawazu et al. | |
| 2003/0126951 | A1 * | 7/2003 | Sanders et al. | 76/107.1 |
| 2003/0165661 | A1 | 9/2003 | Noguchi et al. | |
| 2009/0137433 | A1 | 5/2009 | Smith et al. | |

OTHER PUBLICATIONS

International Search Report and Written Opinion of the International Searching Authority issued in corresponding International Patent Application No. PCT/US10/57580 dated Jan. 21, 2011 (13 pages).

Article entitled, "Indialite Mineral Data," from www.mineralsweb.com (5 pages).

* cited by examiner

*Primary Examiner* — Randy Gulakowski

*Assistant Examiner* — Jeffrey Washville

(74) *Attorney, Agent, or Firm* — Kilyk & Bowersox, P.L.L.C.

(57) ABSTRACT

A cordierite material having an increased α-cordierite phase and a reduced β-cordierite phase is described. Methods of making the cordierite material are further described, and a proppant containing the cordierite is further described, as well as use of the proppant.

41 Claims, No Drawings

CORDIERITE HAVING AN INCREASED ALPHA-CORDIERITE PHASE AND A PROPPANT CONTAINING THE SAME

BACKGROUND OF THE INVENTION

This application claims the benefit under 35 U.S.C. §119(e) of prior U.S. Provisional Patent Application No. 61/286,833, filed Dec. 16, 2009, which is incorporated in its entirety by reference herein.

The present invention relates to cordierite and a proppant containing cordierite and methods of making the same.

SUMMARY OF THE PRESENT INVENTION

A feature of the present invention is to provide a cordierite (e.g., powder) having an increased α-cordierite phase.

A further feature of the present invention is to provide a cordierite (e.g., powder) having a decreased β-cordierite phase.

A further feature of the present invention is to provide a cordierite (e.g., powder) having increased mechanical strength.

An additional feature of the present invention is to provide a cordierite (e.g., powder) having an increased or improved crush strength compared to commercially-available cordierite.

A further feature of the present invention is to provide a proppant that has cordierite present in one or more parts of the proppant, wherein the cordierite has an increased α-cordierite phase and/or a reduced β-cordierite phase.

A further feature of the present invention is to provide a cordierite ceramic powder, wherein the cordierite has an increased α-cordierite phase and once fabricated into a ceramic article and sintered, displays a higher mechanical strength and/or toughness, optionally making it suitable for structural ceramic applications.

A further feature of the present invention is to provide methods to prop open subterranean formation fractures using one or more proppants which contain the cordierite of the present invention.

More particularly, the present invention relates to a cordierite having an α-cordierite phase and a β-cordierite phase, wherein the α-cordierite phase can have an average α-cordierite phase in an amount of at least 10 wt % based on the total weight of all cordierite phases present in the cordierite material. The cordierite can be in any form, such as a powder, pellet, agglomerate, sintered state, layer, and the like.

Optionally, the cordierite powder can have a mechanical strength of at least 70 MPa.

Optionally, the cordierite powder can have a total pore volume of 40% or less.

The present invention further relates to a proppant that contains the cordierite of the present invention. As an option, the present invention relates to a proppant comprising a template material and a shell on the template material, wherein the shell comprises a material that includes the cordierite of the present invention. The template material can be a hollow sphere, a solid sphere, or a porous core having one or more voids. In lieu of a sphere, the core can be a non-spheroidal shape.

The present invention further relates to a method to prop open subterranean formations using one or more proppants of the present invention, which are preferably contained in proppant formulations.

The present invention further relates to methods of making the cordierite of the present invention, which can include heating a starting cordierite (e.g., powder) having a β-cordierite phase and having an α-cordierite phase. The α-cordierite phase in the starting cordierite is present in an amount of less than the amount of α-cordierite phase in the final cordierite product. The method includes heating the starting cordierite to a conversion temperature sufficient to convert at least a portion of the β-cordierite phase to an α-cordierite phase and form a heated product. The heated product is then subjected to cooling, preferably rapid cooling, to a temperature below the conversion temperature. Additional processing steps can be used.

It is to be understood that both the foregoing general description and the following detailed description are exemplary and explanatory only and are intended to provide a further explanation of the present invention, as claimed.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

DETAILED DESCRIPTION OF THE PRESENT INVENTION

The present invention relates to a cordierite having an α-cordierite phase that is greater than the β-cordierite phase present in the cordierite.

The α cordierite phase can exist in a hexagonal crystal structure (space group P6/mmc) and the β cordierite phase can exist in an orthorhombic crystal structure (space group Cccm). In general, the unit cell volume of the β crystal can be equal to or more than approximately twice that of the α crystal. During the transition from the α-phase to the β-phase, a volume expansion occurs, which may induce strain fields with the ceramic system, thus improving the mechanical properties of the ceramic. The transformation from the α-phase to the β-phase occurs spontaneously during cooling of the ceramic material from elevated temperatures. By adding various dopants to the cordierite, the spontaneous transformation of the α-phase to the β-phase can be suppressed, thus leading to increased concentrations of the α-phase in the cordierite powder/ceramic material.

Fracture of a brittle material, such as a ceramic material, typically occurs along the cleavage planes of the crystal. In the case of the orthorhombic structure (β-phase), three primary cleavage directions are possible along the direction vectors [100], [010], and [001]. By contrast, in the hexagonal system (α-phase) only one primary cleavage plane exists, this being parallel to the basal plane and given by the direction vector [001]. Thus the hexagonal crystal system is expected to confer improved mechanical properties over the orthorhombic crystal system.

In addition, or in the alternative, the present invention relates to cordierite having an α-cordierite phase that is the highest cordierite phase present in the cordierite compared to all other cordierite phases present.

In the alternative, or in addition, the present invention relates to cordierite having an α-cordierite phase and a β-cordierite phase and wherein the α-cordierite phase is present in an average amount of at least 10 wt % based on the total weight of all cordierite phases present.

For purposes of the present invention, the cordierite can be in the form of powder, particles, agglomerates, a green body, pellet, layer(s), plate, and the like. The cordierite can be sintered or unsintered in any of these forms.

In the cordierite of the present invention, the α-cordierite phase can be present in an average amount of from 10 wt % to 99.9 wt %, based on the total weight of all cordierite phases present in the material. The α-cordierite phase can be present in an amount of at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, at least 98 wt %, or at least 99 wt % based on the total weight of all cordierite phases present in the cordierite (e.g., powder). As an option, the α-cordierite phase can be present in an amount from 10 wt % to 99 wt %, from 15 wt % to 95 wt %, from 20 wt % to 95 wt %, from 25 wt % to 95 wt %, from 30 wt % to 95 wt %, from 35 wt % to 90 wt %, from 40 wt % to 85 wt %, from 45 wt % to 80 wt %, from 45 wt % to 75 wt %, from 45 wt % to 70 wt %, from 45 wt % to 65 wt %, from 45 wt % to 60 wt %, or from 45 wt % to 55 wt % based on the total weight of all cordierite phases present. The amount of the α-cordierite phase present in the cordierite (e.g., powder) of the present invention can be any weight percent or range within these various weight percents provided herein. The α-cordierite phase amount present can be measured as an average amount. For instance, in the case of powder, a representative sample of the powder, of approximately 5 grams of the cordierite powder can be measured for crystallographic phase assemblages using radiation diffraction techniques, such as x-ray diffraction, neutron diffraction, or synchrotron radiation diffraction. The diffraction data thus collected can be analyzed using a least squares profile fitting technique, such as the Rietveld Method. Examples of such profile fitting software packages include LHPM10, Rietica, Siroquant, GSAS, etc. From the numerical analysis of the diffraction data, the mass fraction of each crystallographic phase in the powder may be determined.

As an option, the β-cordierite phase present in the cordierite of the present invention can be present in an amount of less than 50 wt %, less than 30 wt %, less than 20 wt %, less than 15 wt %, less than 10 wt %, less than 5 wt %, or less than 1 wt % based on the total weight of all cordierite phases present in the cordierite. The β-cordierite phase can be present in an amount of from 0.1 wt % to 25 wt % or from 0.5 wt % to 50 wt % or other weight percents within these ranges. The weight percent can be a measured weight amount in the cordierite or it can be an averaged weight amount based on the tests described earlier.

As an option, the cordierite of the present invention can have a μ-cordierite phase of 10 wt % or less, 5 wt % or less, 1 wt % or less, 0.1 wt % or less, or 0.01 wt % or less, based on the total weight of all cordierite phases present in the cordierite. The μ-cordierite phase can be present in an amount of from 0.01 wt % to 10 wt % or from 0.1 wt % to 5 wt % or other amounts within these ranges. This weight percent can be a measured amount in the cordierite or it can be an averaged amount based on the tests described above.

As an option, the cordierite of the present invention can have an α-cordierite phase wherein all other crystalline forms of cordierite (other than the α-cordierite phase) are present in an amount of 50 wt % or less, 25 wt % or less, 20 wt % or less, 15 wt % or less, 10 wt % or less, 5 wt % or less, 1 wt % or less, 0.5 wt % or less, such as from 0.01 wt % to 30 wt %, from 0.1 wt % to 25 wt %, from 1 wt % to 15 wt %, and the like (based on the total weight of all cordierite phases present), wherein this amount is a measured amount in the cordierite or is an averaged amount using the tests described above.

As an option, the cordierite of the present invention can have a cordierite purity (as compared to non-cordierite material present in the cordierite powder) of at least 95 wt %, at least 97 wt %, at least 98 wt %, at least 99 wt %, or at least 99.5 wt %. The cordierite powder can have a cordierite purity of from 95 wt % to 99.99 wt % or higher.

The cordierite powder of the present invention can have a BET surface area of from 1 $m^2/g$ to 50 $m^2/g$ or higher, or from 5 $m^2/g$ to 10 $m^2/g$, or from 10 $m^2/g$ to 20 $m^2/g$, or from 20 $m^2/g$ to 50 $m^2/g$, or at least 5 $m^2/g$, or at least 10 $m^2/g$, or at least 15 $m^2/g$, or at least 20 $m^2/g$, or at least 25 $m^2/g$, or at least 30 $m^2/g$, or at least 35 $m^2/g$ or at least 40 $m^2/g$, and the like.

The mean particle size of the cordierite powder of this invention can range from a minimum size of 0.3 micron to 50 microns, or from 0.8 micron to 1.2 microns, or from 1.2 microns to 2 microns, or from 2 microns to 5 microns, or from 5 microns to 10 microns, or from 10 microns to 50 microns, or from 15 microns to 45 microns, or from 20 microns to 40 microns, or from 25 microns to 35 microns. The crystallographic density of the cordierite powder, as determined from the diffraction data analysis, of this invention may range from 2.40 $g/cm^2$ to 2.60 $g/cm^2$, or from 2.42 $g/cm^2$ to 2.55 $g/cm^2$. The specific gravity of the powder of this invention, may range from 2.38 $g/cm^2$ to 2.58 $g/cm^2$, or from 2.40 $g/cm^2$ to 2.54 $g/cm^2$. The cordierite powder of this invention may consist of individual crystallites or an assemblage of crystallites that are weakly aggregated to form a larger particle. The volume fraction of porosity of the powder particles may range from 0% to approximately 50%, with the mean pore size within the powder particle ranging from 0.01 micron to approximately 5 microns. With respect to various properties, amounts above or below these ranges are possible, and the cordierite of the present invention can have one or more of these properties in any combination.

As an option, the cordierite powder of the present invention can also contain metal, metal oxides, minerals, or any combination thereof. Examples include, but are not limited to, alumina, zirconia, stabilized zirconia, mullite, zirconia toughened alumina, spinel, aluminosilicates (e.g., mullite, cordierite), boron carbide, boron nitride, silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, and the like, or any combination thereof. Metallic particulates include, but are not limited to, iron, nickel, chromium, silicon, aluminum, copper, cobalt, beryllium, tungsten, molybdenum, titanium, magnesium, silver, as well as alloys of metals, and the like, or any combination thereof. Metallic particulates may also include the family of intermetallic materials, such as the iron aluminides, nickel aluminides, titanium aluminides, and the like. Organic particulates include, but are not limited to, carbon-based structures such as nanotubes, nanorods, nanowires, nanospheres, microspheres, whiskers of oxide, fullerenes, carbon fibers, nomex fibers, and the like, or combinations thereof. Mineral-based particulates include, but are not limited to, such materials as kyanite, mica, quartz, sapphire, corundum, steatite, including the range of aluminosilicate minerals that display high hardness and strength. Single crystal materials can be used. Resin material (e.g., organic resin(s)) with or without reinforcing particulates can be used as reinforcing material. The amount of the metal, metal oxide, and/or mineral in the cordierite powder of the present invention can be present, for instance, in an amount of from 0 wt % to about 30 wt % or more, (e.g., from 0.5 wt % to 25 wt %, from 1 wt % to 20 wt %, from 3 wt % to 15 wt %, and the like) based on the total weight of the cordierite (including impurities).

As an option, the cordierite powder of the present invention can include at least one dopant, such as alumina (e.g., above that of stoichiometry for the cordierite phase, i.e. excess alumina in the structure), calcium, yttrium, cerium, lanthanum, or scandium or any combination thereof. The dopant can be present in an amount of from 0.01 wt % to about 5 wt % or more.

As an option, the cordierite powder of the present invention can be in a non-agglomerated form, an agglomerated form, a sintered form, or a powder that has been milled to a reduced particle size distribution and either dried to the powder form or maintained as a slurry.

As an option, the cordierite powder of the present invention, once consolidated and sintered to form a ceramic body with a bar or other geometry, such as one with a rectangular cross-section, can have a mechanical strength (4 point flexure) of at least 70 MPa, such as from 70 MPa to 220 MPa, from 80 MPa to 110 MPa, from 75 MPa to 110 MPa, from 90 MPa to 110 MPa, at least 80 MPa to 90 MPa and other amounts within these ranges or above these ranges. These flexural strength tests are conducted in a 4 point flexure test fixture according to ASTM C1161, Configuration B. Alternatively the mechanical strength of the sintered ceramic may be determined using a bi-axial flexure method according to ASTM C1499. In a further test, the powder may be consolidated into a cylindrical perform of approximately 0.5 inch in diameter by approximately 0.25 inch in height. The sintered cylinder is then subjected to a compressive load with the loading axis parallel to the radial direction of the cylinder. The load is increased until rupture of the cylinder is observed. At rupture, the load applied is recorded and the tensile strength of the material determined. This is the so-called split tensile test. In a further method to test the mechanical strength of the cordierite powder, the powder may be consolidated into a spherical form, either with or without a void in the center of the sphere. The spherical particle thus formed is sintered into a ceramic body and the crush strength and mass fraction of fines generated at a given applied load characterized. This test is conducted as per API Recommended Practice 56 and 60 or according to ISO 13503-2.

As an option, the cordierite powder can have a total pore volume of 15% or less, such as 10% or less, 7.5% or less, 5% or less, 2.5% or less, 1 wt % or less, 0.5 wt % or less, based on the total volume of the cordierite powder.

The pore volume of the cordierite powder can be determined using either the BET (Brunauer, Emmitt, Teller Method) or mercury porosimetry methods on a representative sample of the powder. The mechanical strength measurements can be based on the measurement of at least 10 samples and the representative strength of the cordierite described by the mean (or average) value of the measured values.

As an option, the cordierite of the present invention can have a crush strength of at least 1,000 psi, at least 2,500 psi, at least 5,000 psi, or at least 10,000 psi based on the following tests. The crush strength of the cordierite powder or proppant can be determined in a uniaxial loading configuration in a strength testing cell with a cavity diameter of 1.5 inches (38.1 mm). The volume of material admitted to the interior of the strength testing cell is 13.8±0.1 mL. Loading of the strength test cell is carried out using a Lloyd Instruments Compression Tester (Model LR100K Plus) at a strain rate of 0.0400 inch per minute (1.016 mm per minute). The compressive force (lbf) is applied to the test cell to subject the proppant pack to various pressures, ranging from 1,000 to 15,000 PSI. After each test load, the sample is removed from the test cell and the weight fraction of fines measured to give an indication of the crush resistance strength of the proppant at a given pressure. This test is carried out in accordance with the requirements of API Recommended Practice 56 and 60 or according to ISO 13503-2.

As an option, the cordierite of the present invention, once formed into a proppant, can have a weight fraction of fines generated by the compressive load of 5,000 psi of 6 wt % or less, such as from 0.5 wt % to 6 wt %, from 0.75 wt % to 5 wt %, from 1 wt % to 5 wt %, and any ranges within these ranges, wherein the percent is the weight percent of total fines generated by the test and based on the total weight of the cordierite material being tested.

The cordierite powder of the present invention, as an option, can have an average size of from 0.1 micron to 10 microns, such as from 0.5 micron to 10 microns, or from 0.5 micron to 4 microns, or from 0.5 micron to 2 microns, or from 1 micron to 2 microns, and the like.

The present invention further relates to a sintered layer comprising the cordierite powder of the present invention in a sintered state. The sintered layer of the cordierite powder of the present invention can be located on a substrate of one or more layers. The sintered layered can be in the shape of a shell or can be in the shape of multiple layers.

The sintered layer can be continuous or non-continuous on a substrate, such as a core. The sintered layer of the present invention can be directly in contact with a core or have intermediate layers located between the core and the sintered layer. The sintered layer can form a distinct layer with the substrate, or the sintered layer can partially or fully diffuse in the core or substrate to functionally form a gradient.

The present invention further relates to a proppant containing the cordierite of the present invention. The cordierite can be present in part of or all of the proppant. The present invention further relates to a proppant containing the sintered layer of the present invention.

The cordierite in a sintered state (e.g., sintered layer or sintered powder) can form a part of the proppant or can be the entire proppant in a solid state or a hollow state or porous state or a state having one or more voids.

The sintered cordierite of the present invention can be present as a sintered layer and form part of a proppant, wherein the sintered layer(s) is directly or indirectly located on a core of the proppant. The core can be a hollow core, porous core, a core having one or more voids, or a solid core. The core can be cenosphere. The core can be a sphere, non-sphere, or have other regular or irregular shapes.

The sintered layer can be in direct contact with the core or one or more intermediate layers can be present between the sintered layer and the core. The sintered layer can form a continuous layer that encapsulates the core or the sintered layer can be a non-continuous layer around the core.

Thus, as an option, the present invention relates to a proppant containing a template material and a shell on the template material, wherein the shell comprises the cordierite of the present invention. The template material can be a hollow sphere or hollow core and can be a single particle, such as a cenosphere, or a collection of several particles that form a core.

The sintered layer of the present invention can have an average grain size of 10 microns or less, such as 5 microns or less, or 1 micron or less, such as from 0.1 micron to 5 microns. Other average grain sizes are possible. The surface can have a maximum grain size, as well as a tight distribution with respect to the grain sizes.

As an option, the cordierite powder of the present invention can form or take the shape of a dense body or a porous body, such as by taking the powder and sintering the powder or densifying the powder using techniques to cause densification (slight densification or heavy densification). The dense body or porous body can have any shape (e.g., shell or portion thereof, solid or hollow sphere, irregular spheres, rods, and the like). The dense body can have a total porosity of less than 5 vol % (e.g., 0.01 vol % to 4.9 vol %, 0.1 vol % to 4.5 vol %, 0.5 vol % to 4 vol %), based on the total porosity of the body. The porous body can have a total porosity of about 10 vol % or more, such as 10 vol % to about 40 vol % (e.g., 10 vol % to 35 vol %, 15 vol % to 30 vol %, 20 vol % to 35 vol %), based on the total porosity of the body.

The cordierite powder of the present invention can be made by taking a starting cordierite (e.g., powder) having a β-cordierite phase and having an α-cordierite phase. The α-cordierite phase in the starting cordierite is present in an amount less than the final amount of α-cordierite phase in the cordierite of the present invention. The method can involve heating the starting cordierite (e.g., powder) to a conversion temperature sufficient to convert at least a portion of the β-cordierite phase to an α-cordierite phase, which forms a heated material (e.g., powder). The heated material can then be subjected to cooling, such as rapid cooling, or quenching to a temperature below the conversion temperature.

Examples of suitable conversion temperatures include from about 1,200° C. to 1,400° C., such as 1,200° C. to 1,250° C., 1,200° C. to 1,390° C., 1,250° C. to 1,350° C., and the like. The heating can occur from 10 minutes to 24 hours or more, such as from 30 minutes to 10 hours, or from 1 hour to 4 hours. The heating temperature is a reference to the temperature of the material (e.g., powder). The heating can occur in a furnace, such as a rotary furnace, or in a mill, such as a heated high-energy mill, or heated attrition mill or heated ball mill. The powder may be heated to the required temperatures using radiative or convective methods, or by electromagnetic radiation (e.g. microwave radiation). The heating can occur in air or in inert atmospheres.

If a mill is used for the heating, the benefit of this process is that the conversion temperature can be achieved and, at the same time, the milling can cause uniform distribution of the heat to achieve a more uniform formation of the cordierite powder of the present invention and, further, the milling can provide desirable particle sizes, such as from 0.1 to 10 microns.

With respect to the step of cooling, preferably, rapid cooling is used, wherein rapid cooling is a reduction of the powder temperature at a rate of 20° C. to 1000° C. per minute. Cooling or quenching can occur in air, inert atmosphere, and/or in fluids, such as water, e.g., quenching in air at temperatures, e.g,. below 40° C., below 25° C., below 10° C., below 0° C., or such cooling can be achieved with cold water, ice, dry ice, liquid nitrogen, or other cooling processes that can achieve rapid cooling.

If a mill is not used for heating, but, instead, a furnace or other heating device is used without a reduction in the size of the starting cordierite material, then the product after heating and, optionally, prior to, during, or after cooling, can be subjected to a particle size reduction, such as the use of a mill or other size reduction device. The particles can be preferably reduced to a size of from about 0.1 to 10 microns or other particles size described earlier.

As an option, the method of the present invention can be repeated one or more times, wherein the heating step can be repeated one or more times, and the cooling step can be repeated one or more times. By doing multiple heating and cooling steps, the amount of α-cordierite phase present in the cordierite powder of the present invention can increase.

As an option in the method of the present invention, at least one dopant (as described earlier) can be present in the starting cordierite powder prior to a heating step.

The present invention includes the following aspects/embodiments/features in any order and/or in any combination:

1. The present invention relates to a cordierite powder or sintered cordierite ceramic article comprising an α-cordierite phase and a β-cordierite phase and wherein said α-cordierite phase is present in an average amount of at least 10 wt % based on the weight percent of all cordierite phases present in said powder, and said cordierite powder has a mechanical strength of at least 70 MPa and optionally, a total pore volume of 40 vol % or less.

2. The cordierite powder or sintered cordierite ceramic article of any preceding or following embodiment/feature/aspect, wherein said α-cordierite phase is present in an average amount of from 10 wt % to 99.9 wt %.

3. The cordierite powder or sintered cordierite ceramic article of any preceding or following embodiment/feature/aspect, wherein said α-cordierite phase is present in an average amount of from 45 wt % to 85 wt %.

4. The cordierite powder or sintered cordierite ceramic article of any preceding or following embodiment/feature/aspect, wherein said β-cordierite phase is present in an amount of less than 50 wt %.

5. The cordierite powder or sintered cordierite ceramic article of any preceding or following embodiment/feature/aspect, wherein said β-cordierite phase is present in an amount of less than 10 wt %.

6. The cordierite powder or sintered cordierite ceramic article of any preceding or following embodiment/feature/aspect, wherein a μ-cordierite phase is present in an amount of 10 wt % or less.

7. The cordierite powder or sintered cordierite ceramic article of any preceding or following embodiment/feature/aspect, wherein a μ-cordierite phase is present in an amount of 1 wt % or less.

8. The cordierite powder or sintered cordierite ceramic article of any preceding or following embodiment/feature/aspect, wherein all other crystalline forms of cordierite are present in an amount of less than 40 wt %.

9. The cordierite powder or sintered cordierite ceramic article of any preceding or following embodiment/feature/aspect, having a cordierite purity of at least 90 wt %, based on the total weight percent of the cordierite powder.

10. The cordierite powder or sintered cordierite ceramic article of any preceding or following embodiment/feature/aspect, having a cordierite purity of from 90 wt % to 99.99 wt %, based on the total weight percent of the cordierite powder.

11. The cordierite powder or sintered cordierite ceramic article of any preceding or following embodiment/feature/aspect, wherein the α-cordierite phase is the largest weight percent cordierite phase present in said cordierite powder.

12. The cordierite powder or sintered cordierite ceramic article of any preceding or following embodiment/feature/aspect, wherein said mechanical strength is from 70 MPa to 220 MPa.

13. The cordierite powder or sintered cordierite ceramic article of any preceding or following embodiment/feature/aspect, wherein said mechanical strength is from 80 MPa to 110 MPa.

14. The cordierite powder or sintered cordierite ceramic article of any preceding or following embodiment/feature/aspect, wherein said total pore volume is 1% by volume to 40% by volume.

15. The cordierite powder or sintered cordierite ceramic article of any preceding or following embodiment/feature/aspect, wherein said total pore volume is from 3% by volume to 15% by volume.

16. The cordierite powder or sintered cordierite ceramic article of any preceding or following embodiment/feature/aspect, wherein said powder is agglomerated.

17. A sintered layer comprising said cordierite powder of any preceding or following embodiment/feature/aspect in a sintered state.

18. A proppant comprising the sintered layer of any preceding or following embodiment/feature/aspect.

19. The proppant of any preceding or following embodiment/feature/aspect, wherein said sintered layer is on a core.

20. The proppant of any preceding or following embodiment/feature/aspect, wherein said core is a hollow core.

21. The proppant of any preceding or following embodiment/feature/aspect, wherein said core is a porous core or a core having one or more voids.

22. The proppant of any preceding or following embodiment/feature/aspect, wherein said core is a solid core.

23. The proppant of any preceding or following embodiment/feature/aspect, wherein said core is a cenosphere.

24. The proppant of any preceding or following embodiment/feature/aspect, wherein said sintered layer is in direct contact with said core.

25. The proppant of any preceding or following embodiment/feature/aspect, wherein one or more intermediate layers are present between said sintered layer and said core.

26. The cordierite powder of any preceding or following embodiment/feature/aspect, further comprising at least one dopant.

27. The cordierite powder of any preceding or following embodiment/feature/aspect, further comprising a metal, metal oxide, mineral, oxide or any combination thereof.

28. A method to make the cordierite powder of any preceding or following embodiment/feature/aspect, comprising heating a starting cordierite powder having a β-cordierite phase and having an α-cordierite phase in an amount of less than said cordierite powder, to a conversion temperature sufficient to convert at least a portion of said β-cordierite phase to α-cordierite phase and form a heated powder, and then subjecting said heated powder to cooling below said conversion temperature.

29. The method of any preceding or following embodiment/feature/aspect, wherein said heating occurs in a mill, and wherein the average particle size of the cordierite powder is reduced.

30. The method of any preceding or following embodiment/feature/aspect, wherein said mill is a high-energy mill.

31. The method of any preceding or following embodiment/feature/aspect, further comprising repeating one or more times said heating step and then said cooling step.

32. The method of any preceding or following embodiment/feature/aspect, wherein at least one dopant is present in said starting cordierite powder prior to said heating.

33. The method of any preceding or following embodiment/feature/aspect, wherein said conversion temperature is from about 1,200° C. to about 1,400° C.

34. The method of any preceding or following embodiment/feature/aspect, wherein said cooling is a quenching such that the conversion temperature is reduced in an amount of from 20° C. to 1000° C. per minute until the temperature of the powder is less than at least 900 ° C.

35. The method of any preceding or following embodiment/feature/aspect, wherein said average particle size is about 0.1 to 10 microns.

36. A dense body comprising the cordierite powder of any preceding or following embodiment/feature/aspect in a sintered state, wherein the dense body has a total porosity of less than 5 vol %, based on the volume of the dense body.

37. A porous body comprising the cordierite powder of any preceding or following embodiment/feature/aspect in a sintered state, wherein the porous body has a total porosity of from about 10 vol % to about 40 vol %, based on the volume of the porous body.

38. The dense body of any preceding or following embodiment/feature/aspect, wherein the dense body has a spherical shape.

39. The porous body of any preceding or following embodiment/feature/aspect, wherein the porous body has a spherical shape.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Example 1

A sample of a commercially available cordierite powder was analyzed using a Siemens D5000 diffractometer fitted with a copper anode tube and Eulerian cradle operating in the standard θ/2θ mode. The data was collected over the 2θ angular range of 5° to 100° with a step size of 0.02°. The resulting diffraction data was analyzed using the Rietveld method to determine phase assemblages. The mass fraction of the α-cordierite and β-cordierite phases was determined to be 3.21±0.38 wt % and 96.79±1.58 wt % respectively.

Example 2

A sample of the commercially available cordierite powder from Example 1 was subjected to a heat treatment consisting of heating the sample to 1350° C. at a rate of 10° C./min and holding at temperature for 240 minutes in air. At the completion of the hold time, the sample was removed from the furnace and cooled at approximately 700° C./min to ambient temperature (25° C.). The sample was then analyzed using XRD with the same operating conditions as described in Example 1. The mass fraction of the α-cordierite and β-cordierite phases was determined to be 53.64±1.79 wt % and 46.36±1.61 wt % respectively.

Example 3

A second sample of powder heat treated according to the procedure detailed in Example 2 was cooled at a rate of 1° C./min to ambient temperature (25° C.). The sample thus processed was analyzed using XRD as per Example 1. The mass fraction of the α-cordierite and β-cordierite phases was determined to be 4.85±0.47 wt % and 95.15±1.39 wt % respectively.

Example 4

A proppant was formulated using commercially available cordierite (containing 3.2±0.38 wt % of the cc-cordierite phase). The proppant sample was sintered in air at 1280° C. for 360 minutes. A sample of the sintered proppant was analyzed using XRD (as per the data collection conditions of example 1). The mass fraction of α-cordierite was determined to be 50.78±1.65 wt %. The creep fines of the proppant sample were measured to be 5.1 wt %

Example 5

A second proppant was formulated using commercially available cordierite (containing 3.2±0.38 wt % of the cc-cordierite phase). The proppant sample was sintered in air at 1280° C. for 360 minutes. A sample of the sintered proppant was analyzed using XRD (as per the data collection conditions of example 1). The mass fraction of α-cordierite was determined to be 47.71±1.72 wt %. The creep fines of the proppant sample were measured to be 7.1 wt %

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A cordierite powder or sintered cordierite ceramic article comprising an α-cordierite phase and a β-cordierite phase and wherein said α-cordierite phase is present in an average amount of at least 10 wt % based on the weight percent of all cordierite phases present in said powder, and said cordierite powder has a mechanical strength of at least 70 MPa and optionally, a total pore volume of 40 vol % or less, wherein said cordierite powder has a mean particle size of from 0.3 micron to 35 microns, and wherein said sintered cordierite ceramic article is formed from said cordierite powder, and wherein said mechanical strength is flexural strength.

2. The cordierite powder or sintered cordierite ceramic article of claim 1, wherein said α-cordierite phase is present in an average amount of from 10 wt % to 99.9 wt %.

3. The cordierite powder or sintered cordierite ceramic article of claim 1, wherein said α-cordierite phase is present in an average amount of from 45 wt % to 85 wt %.

4. The cordierite powder or sintered cordierite ceramic article of claim 1, wherein said β-cordierite phase is present in an amount of less than 50 wt %.

5. The cordierite powder or sintered cordierite ceramic article comprising an α-cordierite phase and a β-cordierite phase and wherein said α-cordierite phase is present in an average amount of at least 10 wt % based on the weight percent of all cordierite phases present in said powder, and said cordierite powder has a mechanical strength of at least 70 MPa and optionally, a total pore volume of 40 vol % or less, wherein said β-cordierite phase is present in an amount of less than 10 wt %, and wherein said mechanical strength is flexural strength.

6. The cordierite powder or sintered cordierite ceramic article of claim 1, wherein a μ-cordierite phase is present in an amount of 10 wt % or less.

7. The cordierite powder or sintered cordierite ceramic article of claim 1, wherein a μ-cordierite phase is present in an amount of 1 wt % or less.

8. The cordierite powder or sintered cordierite ceramic article of claim 1, wherein all other crystalline forms of cordierite are present in an amount of less than 40 wt %.

9. The cordierite powder or sintered cordierite ceramic article of claim 1, having a cordierite purity of at least 90 wt %, based on the total weight percent of the cordierite powder.

10. The cordierite powder or sintered cordierite ceramic article of claim 1, having a cordierite purity of from 90 wt % to 99.99 wt %, based on the total weight percent of the cordierite powder.

11. The cordierite powder or sintered cordierite ceramic article of claim 1, wherein the α-cordierite phase is the largest weight percent cordierite phase present in said cordierite powder.

12. The cordierite powder or sintered cordierite ceramic article of claim 1, wherein said mechanical strength is from 70 MPa to 220 MPa.

13. The cordierite powder or sintered cordierite ceramic article of claim 1, wherein said mechanical strength is from 80 MPa to 110 MPa.

14. The cordierite powder or sintered cordierite ceramic article of claim 1, wherein said total pore volume is 1% by volume to 40% by volume.

15. The cordierite powder or sintered cordierite ceramic article of claim 1, wherein said total pore volume is from 3% by volume to 15% by volume.

16. The cordierite powder or sintered cordierite ceramic article comprising an α-cordierite phase and a β-cordierite phase and wherein said α-cordierite phase is present in an average amount of at least 10 wt % based on the weight percent of all cordierite phases present in said powder, and said cordierite powder has a mechanical strength of at least 70 MPa and optionally, a total pore volume of 40 vol % or less, wherein said powder is agglomerated, and wherein said mechanical strength is flexural strength.

17. A sintered layer comprising said cordierite powder of claim 1 in a sintered state.

18. A proppant comprising the sintered layer of claim 17.

19. The proppant of claim 18, wherein said sintered layer is on a core.

20. The proppant of claim 19, wherein said core is a hollow core.

21. The proppant of claim 19, wherein said core is a porous core or a core having one or more voids.

22. The proppant of claim 19, wherein said core is a solid core.

23. The proppant of claim 19, wherein said core is a cenosphere.

24. The proppant of claim 19, wherein said sintered layer is in direct contact with said core.

25. The proppant of claim 19, wherein one or more intermediate layers are present between said sintered layer and said core.

26. The cordierite powder of claim 1, further comprising at least one dopant.

27. The cordierite powder of claim 1, further comprising a metal, metal oxide, mineral, oxide or any combination thereof.

28. A method to make the cordierite powder of claim 1, comprising heating a starting cordierite powder having a β-cordierite phase and having an α-cordierite phase in an amount of less than said cordierite powder, to a conversion temperature sufficient to convert at least a portion of said β-cordierite phase to α-cordierite phase and form a heated powder, and then subjecting said heated powder to cooling below said conversion temperature.

29. The method of claim 28, wherein said heating occurs in a mill, and wherein the average particle size of the cordierite powder is reduced.

30. The method of claim 29, wherein said mill is a high-energy mill.

31. The method of claim 28, further comprising repeating one or more times said heating step and then said cooling step.

32. The method of claim 28, wherein at least one dopant is present in said starting cordierite powder prior to said heating.

33. The method of claim 28, wherein said conversion temperature is from about 1,200° C. to about 1,400° C.

34. The method of claim 28, wherein said cooling is a quenching such that the conversion temperature is reduced in an amount of from 20° C. to 1000° C. per minute until the temperature of the powder is less than at least 900 ° C.

35. The method of claim 28, wherein said average particle size is about 0.1 to 10 microns.

36. A dense body comprising the cordierite powder of claim 1 in a sintered state, wherein the dense body has a total porosity of less than 5 vol %, based on the volume of the dense body.

37. A porous body comprising the cordierite powder of claim 1 in a sintered state, wherein the porous body has a total porosity of from about 10 vol % to about 40 vol %, based on the volume of the porous body.

38. The dense body of claim 36, wherein the dense body has a spherical shape.

39. The porous body of claim 37, wherein the porous body has a spherical shape.

40. The cordierite powder of claim 1, wherein said cordierite powder has a mean particle size of from 0.3 micron to 10 microns.

41. The cordierite powder of claim 1, wherein said cordierite powder has a mean particle size of from 0.3 micron to 5 microns.

* * * * *

UNITED STATES PATENT AND TRADEMARK OFFICE

CERTIFICATE OF CORRECTION

PATENT NO. : 8,916,505 B2
APPLICATION NO. : 12/951347
DATED : December 23, 2014
INVENTOR(S) : Robert D. Skala It is certified that error appears in the above-identified patent and that said Letters Patent is hereby corrected as shown below:

IN THE CLAIMS:

Claim 5, Column 11, line 61, "The" should read --A--.

Claim 5, Column 12, line 3, insert --, wherein said cordierite powder has a mean particle size of from 0.3 micron to 35 microns-- after "flexural strength" and before the ".".

Claim 16, Column 12, line 36, "The" should read --A--.

Claim 16, Column 12, line 44, insert --, wherein said cordierite powder has a mean particle size of from 0.3 micron to 35 microns-- after "flexural strength" and before the ".".

Signed and Sealed this
Thirty-first Day of March, 2015

Michelle K. Lee
*Director of the United States Patent and Trademark Office*